United States Patent

Kühling et al.

Patent Number: 5,618,906
Date of Patent: Apr. 8, 1997

[54] PROCESS FOR THE PRODUCTION OF THERMOPLASTIC POLYCARBONATES

[75] Inventors: Steffen Kühling, Meerbusch; Jürgen Stebani, Krefeld, both of Germany

[73] Assignee: Bayer Aktiengesellschaft, Leverkusen, Germany

[21] Appl. No.: 598,503

[22] Filed: Feb. 8, 1996

Related U.S. Application Data

[63] Continuation-in-part of Ser. No. 443,725, May 18, 1995, abandoned.

[30] Foreign Application Priority Data

Jun. 1, 1994 [DE] Germany ............ 44 19 230.4

[51] Int. Cl.$^6$ ...................... C08G 63/02
[52] U.S. Cl. .............. 528/196; 528/198; 528/199
[58] Field of Search ............. 528/196, 198, 528/199

[56] References Cited

U.S. PATENT DOCUMENTS

| 5,302,717 | 4/1994 | McGhee et al. | 546/226 |
| 5,340,905 | 8/1994 | Kühling et al. | 528/199 |
| 5,373,082 | 12/1994 | Kauth et al. | 528/196 |
| 5,399,659 | 3/1995 | Kühling et al. | 528/199 |

FOREIGN PATENT DOCUMENTS

| 0481296 | 4/1992 | European Pat. Off. . |
| 4238123 | 5/1994 | Germany . |

*Primary Examiner*—Terressa Mosley
*Attorney, Agent, or Firm*—Connolly & Hutz

[57] ABSTRACT

A process is described for preparing solvent-free polycarbonate using phosphazene catalysts.

6 Claims, No Drawings

PROCESS FOR THE PRODUCTION OF THERMOPLASTIC POLYCARBONATES

This is a continuation in part of Ser. No. 443,725, filed May 18, 1995, now abandoned.

The present invention provides a transesterification process for the production of solvent-free polycarbonate, starting from diphenols, carbonic acid diaryl esters and optionally branching agents and/or monophenols together with catalysts at temperatures of between 80° C. and 400° C. and pressures of 1000 mbar to 0.01 mbar, which process is characterised in that phosphazenes of the formula (1)

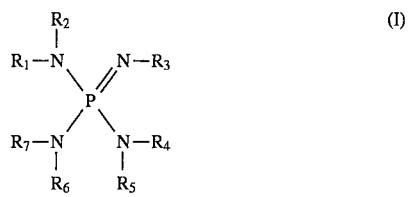

in which $R_1$, $R_2$, $R_3$, $R_4$, $R_5$, $R_6$, $R_7$, =H, alkyl, alkenyl, cycloalkyl, aryl or cycloalkenyl and the residues $R_1$, $R_2$, $R_3$, $R_4$, $R_5$, $R_6$, $R_7$, are dentical or different, or of the formula (2)

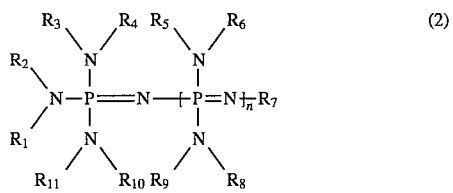

in which $R_1$ to $R_{11}$=H, alkyl, alkenyl, cycloalkyl, aryl or cycloalkenyl, n=1 to 10 and the residues $R_1$ to $R_{11}$ are identical or different, or of the formula (3)

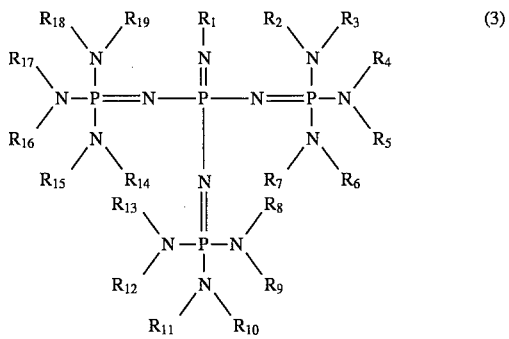

in which $R_1$ to $R_{19}$=H, alkyl, alkenyl, cycloalkyl, aryl or cycloalkenyl or compositions obtained from the phosphazenes (1) or (2) or (3) with a component selected from the group consisting of carbonic acid, acetic acid, nitric acid, water, hydrohalic acids, monophenols, diphenols, phosphoric acid and boric acid, are used as catalysts in quantities of $10^{-2}$ to $10^{-8}$ mol relative to 1 mol of diphenol.

The polycarbonates produced using the process according to the invention are solvent-free, have a light intrinsic colour and are largely free of unwanted defects in the polycarbonate.

The transesterification catalysts to be used according to the invention are, for example, known from Angew. Chemie, 99 (11), pages 1212–1214 (1987), Nachrichten aus Chemie, Technik und Labor, 38, page 1214–1226 (1990) and from Chimia, 39 (9), pages 269–272 (1985).

The production of aromatic oligo-/polycarbonates using the melt transesterification process is known from the literature.

The catalysts described in this process are basic alkali metal, alkaline-earth metal and transition metal hydroxides, alkoxides, carbonates, acetates, boranates, hydrogen phosphates and hydrides. When these compounds are used, unwanted secondary reactions occur during transesterification which lead to faulty structures, such that uncontrollably branched polycarbonates are obtained (see also comparative example 1), the optical and mechanical properties of which are deficient in comparison with linear polycarbonate.

It has now been found that light-coloured polycarbonates may be obtained by using phosphazene catalysts of the formula (1) or of the formula (2) or of the formula (3). The catalysts used according to the invention have higher thermal stability than conventional organic bases (for example ammonium, phosphonium bases), so that fewer decomposition products are found in the distillate. The polycarbonates produced using the process according to the invention are moreover largely free of unwanted defects in the polycarbonate.

For the purposes of the process according to the invention, largely free of unwanted defects in the polycarbonate means that the content of branching agents of the formula (4)

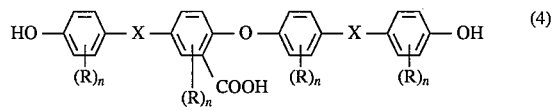

with $X=C_1-C_8$ alkylidene or cycloalkylidene, S or a single bond and $R=CH_3$, Cl or Br and n=zero, 1 or 2, in the polycarbonate does not exceed a value of 300 ppm after total saponification and HPLC determination.

Diphenols suitable for the process according to the invention are those of the formula (5)

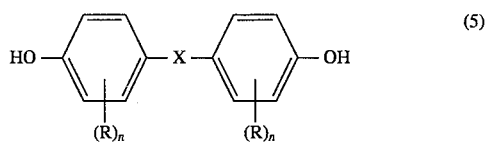

in which

X is $C_1-C_8$ alkylidene or cycloalkylidene, S or a single bond and

R is $CH_3$, Cl or Br and n is zero, 1 or 2.

Preferred diphenols are, for example:
4,4'-dihydroxydiphenyl,
4,4'-dihydroxydiphenyl sulphide,
2,2-bis-(4-hydroxyphenyl)propane,
2,2-bis-(3,5-dimethyl-4-hydroxyphenyl)propane,
2,2-bis-(3,5-dichloro-4-hydroxyphenyl)propane,
2,2-bis-(3,5-dibromo-4-hydroxyphenyl)propane,
1,1-bis-(4-hydroxyphenyl)cyclohexane and
1,1-bis-(4-hydroxyphenyl)-3,3,5-trimethylcyclohexane.

Of the above-stated diphenols, those particularly preferred are 2,2-bis-(4-hydroxyphenyl)propane and 1,1-bis-(4-hydroxyphenyl)-3,3,5-trimethylcyclohexane.

The above diphenols may be used to produce homopolymers or copolymers.

The polycarbonates may be branched in a deliberate and controlled manner by using small quantities of branching agents. Some suitable branching agents are:
phloroglucinol,
4,6-dimethyl-2,4,6-tri-(4-hydroxyphenyl)hept-2-ene,
4,6-dimethyl-2,4,6-tri-(4-hydroxyphenyl)heptane,
1,3,5-tri-(4-hydroxyphenyl)benzene,
1,1,1-tri-(4-hydroxyphenyl)ethane,
tri-(4-hydroxyphenyl)phenylmethane,
2,2-bis-[4,4-bis-(4-hydroxyphenyl)cyclohexyl]propane,
2,4-bis-(4-hydroxyphenylisopropyl)phenol,
2,6-bis-(2-hydroxy-5'-methylbenzyl)-4-methylphenol,
2-(4-hydroxyphenyl)-2-(2,4-dihydroxyphenyl)propane,
hexa-(4-(4-hydroxyphenylisopropyl)phenyl)-ortho-terephthalic acid ester,
tetra-(4-hydroxyphenyl)methane,
tetra-(4-(4-hydroxyphenylisopropyl)phenoxy)methane,
1,4-bis-((4',4'-dihydroxytriphenyl)methyl)benzene and in particular
$\alpha,\alpha',\alpha''$-tris(4-hydroxyphenyl)- 1,3,5-triisopropylbenzene.

Further possible branching agents are 2,4-dihydroxybenzoic acid, trimesic acid, cyanuric chloride and 3,3-bis-(3-methyl-4-hydroxyphenyl)-2-oxo-2,3-dihydroindole.

The 0.05 to 2 mol. % of branching agents, relative to the diphenols used, which are optionally also to be used, may be used together with the diphenols.

Carbonic acid diesters for the purposes of the present invention are di-$C_6$-$C_{14}$-aryl esters, preferably the diesters of phenol or alkylosubstituted phenols, namely diphenyl carbonate or, for example, dicresyl carbonate. The carbonic acid diesters are used in a quantity of 1.01 to 1.30 mol, preferably of 1.02 to 1.15 mol, relative to one 1 mol of bisphenol.

Care must be taken to ensure that the reaction components, namely the diphenols and the carbonic acid diaryl esters, contain no alkali metal and alkaline-earth metal ions, wherein quantities of less than 0.01 ppm of alkali metal and alkaline-earth metal ions may be tolerated. Such pure carbonic acid diaryl esters or diphenols may be obtained by recrystallising, washing or distilling the carbonic acid diaryl esters or diphenols. In the process according to the invention, the content of alkali metal and alkaline-earth metal ions has to be <0.01 ppm in both the diphenol and the carbonic acid diester in order to avoid a non-controlled presence of alkali metal ions or alkaline-earth metal ions at the beginning of the reaction.

Catalysts for the purposes of the process according to the invention are, for example:

phosphazene base $P_5$-t-Bu=1-tert.-butyl-4,4,6,6,6-pentakis-(dimethylamino)-2,2bis [tris(dimethylamino]-phosphorus-anylidene-amino]-$2\lambda^5,4\lambda^5$-catenartriphosphazene, phosphazene base $P_4$-t-Oct=1-tert.-octyl-4,4,6,6,6-pentakis-(dimethylamino)-2,2bis [tris(dimethylamino]-phosphorus-anylidene-amino]-$2\lambda^5,4\lambda^5$-catenatriphosphazene, phosphazene base $P_5$-t-Oct=1-tert.-octyl-4,4,4-tris-(dimethylamono)-2,2-bis [tris(dimethylamino]-phosphorus-anylidene-amino]-$2\lambda^5,4\lambda^5$-catenadi-(phosphazene), phosphazene base P4-t-Bu=1-tert.-butyl-4,4,4-tris-(dimethylamino)-2,2-bis [tris(dimethylamino]-phosphorus-anylidene-amino-$2\lambda^5,4\lambda^5$-catenadi-(phosphazene), phosphazene base $P_2$-t-Et=1-ethyl-2,2,4,4,4-pentakis-(dimethylamino)-$2\lambda^5,4\lambda^5$-catenadi-(phosphazene),
preferred catalysts are:
phosphazene base $P_1$-t-Oct=tert.-octyliminotris-(dimethylamino)phosphorane,
phosphazene base $P_1$-t-butyl=tert.-butyliminotris-(dimethylamino)phosphorane,
BEMP=2-tert.-butylimino-2-diethylamino- 1,3 -dimethylperhydro- 1,3 -diaza-2phosphorine.

Polycarbonate production may proceed in a single stage, the aromatic dihydroxy compounds and the carbonic acid diesters are then reacted under polycondensation conditions customary from the literature.

Such conditions are, for example, melting of the aromatic dihydroxy compound and of the carbonic acid diester at temperathres of 80° to 250° C., preferably at 100° to 230° C., particularly at 120° to 190° C. under standard pressure in 0 to 5 hours, preferably 0.25 to 3 hours. The catalyst according to the invention or combination of catalysts according to the invention may be added before melting or to the molten educts. An oligocarbonate is then produced from the aromatic dihydroxy compound and the carbonic acid diester by distilling off the monophenol by applying a vacuum and increasing the temperature. The polycarbonate is thereafter produced by polycondensation by further increasing the temperature to 240° to 400° C. and reducing the pressure down to 0.01 mbar.

It may, however, also be advantageous to perform the polycondensation in two stages (1st stage, oligocarbonate production using the catalysts according to the invention, 2nd stage, polycarbonate production with the addition of alkali metal/alkaline-earth metal catalysts).

The oligocarbonates of the first stage have average molecular weights $M_w$ of 3,000 to 24,000, preferably of 5,000 to 20,000, determined by measuring their relative solution viscosity in dichloromethane or in mixtures of equal quantities by weight of phenol/o-dichlorobenzene calibrated by light scattering. The molecular weights of the oligocarbonates of the first stage are determined by the desired final viscosity of the polycarbonates; thus, low molecular weight polycarbonates are obtained in the second stage by condensation of low molecular weight oligocarbonates, and higher molecular weight polycarbonates are obtained by condensation of higher molecular weight oligocarbonates. The temperature for production of these oligocarbonates is between 100° C. and 290° C., preferably between 150° C. and 280° C. The monophenols arising from transesterification to yield the oligocarbonate are eliminated by applying a vacuum of 1 bar to 0.5 mbar, preferably of <500 mbar to 1 mbar. In the second stage of oligocarbonate polycondensation, the polycarbonate is produced by adding an alkali metal/alkaline-earth metal catalyst to the oligocarbonate and further increasing the temperature to 230° to 400° C., preferably 250 to 320° C. and at a pressure of <100 mbar to 0.01 mbar.

The alkali metal/alkaline-earth metal catalysts are preferably used in quantities of $10^{-8}$ to $10^{-4}$ mol relative to 1 mol of diphenol, particularly preferably at a concentration of $10^{-7}$ to $10^{-5}$ mol. Examples of compounds used are lithium, sodium, potassium, caesium, calcium, barium, magnesium hydroxides, carbonates, halides, phenolates, diphenolates, fluorides, acetates, phosphates, hydrogen phosphates, boranates. Using the alkali metal or alkaline-earth metal catalysts does not conflict with the above-stated requirement of purity of the reaction partners. For the purposes of the process according to the invention, the reaction of the aromatic dihydroxy compound and of the carbonic acid diester may be performed continuously or discontinuously, for example in stirred-tank reactors, film evaporators, falling-film evaporators, stirred-tank reactors connected in series, extruders, kneaders, simple disk reactors and high viscosity disk reactors.

The reaction of the oligocarbonate to yield to the polycarbonate may also proceed in accordance with WO 90/7536 or EP-A 338 085, by crystallising the oligocarbonate produced according to the invention and performing polycondensation in the solid phase.

The aromatic polycarbonates of the process according to the invention should have weight average molecular weights $M_w$ of 18,000 to 60,000, preferably of 19,000 to 40,000, determined by measuring their relative solution viscosity in dichloromethane or in mixtures of equal quantities by weight of phenol/o-dichlorobenzene, calibrated by light scattering.

The polycarbonates produced according to the invention have a light intrinsic colour, preferably have a low OH terminal group content of <1,200 ppm and are resistant to hydrolysis and the action of heat.

In order to limit the weight average molecular weights $M_w$ of the polymers, molecular weight regulators, such as for example alkylphenol (isooctylphenol, t-butylphenol, cumylphenol) may be added in the requisite quantities in a known manner (EP 360 578).

In order to improve properties, auxiliary substances and reinforcing agents may be incorporated into the polycarbonates produced according to the invention. Such substances which may, inter alia, be considered are: stabilisers (for example UV, heat, gamma radiation stabilisers), anti-static agents, flow auxiliaries, mould release agents, flame retardants, pigments, finely divided minerals, fibrous materials, for example alkyl and aryl phosphites, phosphates, phosphanes, low molecular weight carboxylic acid esters, halogen compounds, salts, chalk, silica flour, glass and carbon fibres.

Other polymers, such as for example polyolefins, polyurethanes, polystyrene, may furthermore also be incorporated into the polycarbonates according to the invention. These substances are preferably added in conventional machinery to the finished polycarbonate, but they may, depending upon requirements, be added at another stage of the process according to the invention.

It is furthermore also possible for particular applications to modify the polycarbonates by condensing blocks, segments and comonomers into them, for example siloxane blocks with OH terminal groups, aromatic and aliphatic polyesters with OH and carboxylic acid terminal groups, polyphenylene sulphide blocks with OH terminal groups, polyphenylene oxide blocks with OH terminal groups.

The polycarbonates produced according to the invention are suitable for customary applications, namely in electrical engineering, in the construction sector and in automotive construction, for example as a support for data storage media, as multi-walled sheet or as a material for electronic equipment casings.

EXAMPLES

Comparative Example 1

114.15 g (0.500 mol) of bisphenol A and 113.54 g (0.530 mol) of diphenyl carbonate are weighed out into a 500 ml three-necked flask fitted with a stirrer, internal thermometer and a Vigreux fractionating column (30 cm, mirrored) with a bridge. Atmospheric oxygen was eliminated from the apparatus by applying a vacuum and flushing with nitrogen (3 times) and the mixture was heated to 150° C. 0.00029 g ($5 \cdot 10^{-4}$ mol.%) of sodium phenolate relative to the bisphenol A, is then added as a 1% aqueous solution and the resultant phenol distilled off at 100 mbar. The temperature is simultaneously raised to 250° C. After 1 hour, the vacuum is reduced to 10 mbar. Polycondensation is achieved by reducing the vacuum to 0.5 mbar and increasing the temperature to 280° C. A solvent-free polycarbonate is obtained with a relative solution viscosity of 1.388 (dichloromethane, 25° C., 5 g/l). The content of branching agent of the formula (6) in the resultant polycarbonate is 350 ppm.

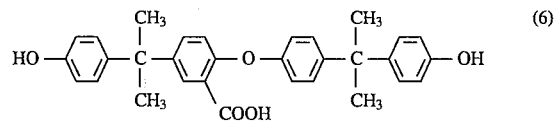

Example 1

114.15 g (0.500 mol) of bisphenol A and 113.54 g (0.530 mol) of diphenyl carbonate are weighed out into a 500 ml three-necked flask fitted with a stirrer, internal thermometer and a Vigreux fractionating column (30 cm, mirrored) with a bridge. Atmospheric oxygen is eliminated from the apparatus by applying a vacuum and flushing with nitrogen (3 times) and the mixture is heated to 150° C. 0.000687 g ($5 \cdot 10^{-4}$ mol.%) of BEMP=2-tert.-butylimino-2-diethylamino-1, 3-dimethylperhydro-1,3-diaza-2-phosphorine, relative to the bisphenol A, is then added as a 1% aqueous solution and the resultant phenol distilled off at 100 mbar. The temperature is simultaneously raised to 250° C. The vacuum is then reduced in stages down to 1 mbar and the temperature increased to 260° C. The temperature is then raised to 280° C. and the mixture stirred for 1.5 hours at 0.1 mbar. A light-coloured, solvent-free polycarbonate is obtained with a relative solution viscosity of 1.234 (dichloromethane, 25° C., 5 g/l). The content of branching agent of the formula (6) in the resultant polycarbonate is 14 ppm. The phenolic OH value of the polycarbonate is 340 ppm.

Example 2

As example 1, but 0.001376 g ($1 \cdot 10^{-3}$ mol.%) of BEMP= 2-tert.-butylimino-2-diethylamino- 1, 3-dimethylperhydro- 1,3-diaza-2-phosphorine is used. A light-coloured, solvent-free polycarbonate is obtained with a relative solution viscosity of 1.254 (dichloromethane, 25° C., 5 g/l). The content of branching agent of the formula (6) in the resultant polycarbonate is 25 ppm. The phenolic OH value of the polycarbonate is 290 ppm.

Example 3

As example 1, but the final polycondensation stage is performed at 300° C. for 1.5 hours. A light-coloured, solvent-free polycarbonate is obtained with a relative solution viscosity of 1.299 (dichloromethane, 25° C., 5 g/l). The content of branching agent of the formula (6) in the resultant polycarbonate is 40 ppm. The phenolic OH value of the polycarbonate is 280 ppm.

Example 4

114.15 g (0.500 mol) of bisphenol A and 113.54 g (0.530 mol) of diphenyl carbonate are weighed out into a 500 ml three-necked flask fitted with a stirrer, internal thermometer and a Vigreux fractionating column (30 cm, mirrored) with a bridge. Atmospheric oxygen is eliminated from the apparatus by applying a vacuum and flushing with nitrogen (3 times) and the mixture is heated to 150° C. 0.000687 g (5·10$^{-4}$ mol.%) of BEMP=2-tert.-butylimino-2-diethylamino-1, 3-dimethylperhydro-1,3-diaza-2-phosphorine, relative to the bisphenol A, is then added as a 1% aqueous solution and the resultant phenol distilled off at 100 mbar. The temperature is simultaneously raised to 250° C. The vacuum is then reduced in stages down to 1 mbar and the temperature increased to 260° C. A light-coloured, solvent-free oligocarbonate is obtained with a relative solution viscosity of 1.157 (dichloromethane, 25° C., 5 g/l). The content of branching agent of the formula (4) in the resultant oligocarbonate is <2 ppm. 0.0001 g of NaOH (5·10$^{-4}$ mol.%) relative to the bisphenol A is then added as a 1% aqueous solution and the oligocarbonate is stirred for 1.5 hours at 280° C. and 0.1 mbar. A light-coloured, solvent-free polycarbonate is obtained with a relative solution viscosity of 1.305 (dichloromethane, 25° C., 5 g/l). The content of branching agent of the formula (6) in the resultant polycarbonate is 55 ppm. The phenolic OH value of the polycarbonate is 220 ppm.

Example 5

114.15 g (0.500 mol) of bisphenol A and 113.54 g (0.530 mol) of diphenyl carbonate are weighed out into a 500 ml three-necked flask fitted with a stirrer, internal thermometer and a Vigreux fractionating column (30 cm, mirrored) with a bridge. Atmospheric oxygen is eliminated from the apparatus by applying a vacuum and flushing with nitrogen (3 times) and the mixture is heated to 150° C. 0.000687 g (5·10$^{-4}$ mol.%) of BEMP=2-tert.-butylimino-2-diethylamino-1, 3-dimethylperhydro-1,3-diaza-2-phosphorine, relative to the bisphenol A, is then added as a 1% aqueous solution and the resultant phenol distilled off at 100 mbar. The temperature is simultaneously raised to 250° C. The vacuum is then reduced in stages down to 1 mbar and the temperature increased to 280° C. A light-coloured, solvent-free oligocarbonate is obtained with a relative solution viscosity of 1.203 (dichloromethane, 25° C., 5 g/l). The content of branching agent of the formula (4) in the resultant oligocarbonate is <2 ppm. 0.0001 g of NaOH (5·10$^{-4}$ mol.%) relative to the bisphenol A is then added as a 1% aqueous solution and the oligocarbonate is stirred for 1.5 hours at 280° C. and 0.1 mbar. A light-coloured, solvent-free polycarbonate is obtained with a relative solution viscosity of 1.312 (dichloromethane, 25° C., 5 g/l). The content of branching agent of the formula (6) in the resultant polycarbonate is 35 ppm. The phenolic OH value of the polycarbonate is 260 ppm.

Example 6

As example 1, but 0.03464 g (1·10$^{-2}$ mol.%) of phosphazene base P$_5$-t-Oct=1-tert. -octyl-4,4,4-tris-(dimethylamino)-2,2-bis[tris(dimethylamino)-phosphorusanylideneamino]-2λ$^5$,4λ$^5$-catenadi-(phosphazene) relative to the bisphenol A is added as a 1% aqueous solution. A light-coloured, solvent-free polycarbonate is obtained with a relative solution viscosity of 1.252 (dichloromethane, 25° C., 5 g/l). The content of branching agent of the formula (6) in the resultant polycarbonate is 28 ppm. The phenolic OH value of the polycarbonate is 360 ppm.

Example 7

As example 1, but 0.001453 g (1·10$^{-3}$ mol.%) of phosphazene base P$_1$-t-Oct=tert.-octyliminotris-(dimethylamino)-phosphorane, relative to bisphenol A, is used as a 1% aqueous solution. A light-coloured, solvent-free polycarbonate is obtained with a relative solution viscosity of 1.228 (dichloromethane, 25° C., 5 g/l). The content of branching agent of the formula (6) in the resultant polycarbonate is 15 ppm. The phenolic OH value of the polycarbonate is 180 ppm.

Example 8

5130 g (22.5 mol) of bisphenol A, 5152 g (24.07 mol) of diphenyl carbonate and 6.49 ml of a 1% aqueous solution of BEMP=2-tert.-butylimino-2-diethylamino-1, 3-dimethylperhydro- 1,3-diaza-2-phosphorine (1·10$^{-3}$ mol .%) are weighed out into a 25 l stirred vessel. The vessel is inertised with nitrogen and the raw materials are heated to 200° C. in 15 minutes. The stirrer is turned on at a melt temperature of 100° C. and a vacuum of 300 mbar applied. The temperature is maintained at 200° C. for one hour and the liberated phenol distilled off via a column. The temperature is raised to 250° C. within a further hour and the vacuum reduced to 100 mbar and then to 10 mbar in 30 minutes at 250° C. Once the temperature of the melt has been raised to 290° C., polycondensation is performed at this temperature under a high vacuum. Once the vacuum has been relieved with nitrogen, the polycarbonate is discharged from the tank and pelletised. The relative solution viscosity of the isolated polycarbonate is 1.213 (dichloromethane, 25° C., 5 g/l), the content of branching agent of the formula (6) is 35 ppm.

Example 9

5130 g (22.5 mol) of bisphenol A, 5104 g (23.85 mol) of diphenyl carbonate and 6.49 ml of a 1% aqueous solution of BEMP=2-tert.-butylimino-2-diethylamino-1, 3-dimethylperhydro-1,3-diaza-2-phosphorine (1·10$^{-3}$ mol.%) are weighed out into a 25 l stirred vessel. The vessel is inertised with nitrogen and the raw materials are heated to 200° C. in 15 minutes. The stirrer is turned on at a melt temperature of 100° C. and a vacuum of 300 mbar applied. The temperature is maintained at 200° C. for one hour and the liberated phenol distilled off via a column. The temperature is raised to 250° C. within a further hour and the vacuum reduced to 100 mbar and then to 5 mbar in 30 minutes at 250° C. Once the temperature of the melt has been raised to 290° C. and the vacuum relieved with nitrogen, 13 mg of sodium phenolate (5·10$^{-4}$ mol.%) are added, a high vacuum applied and polycondensation performed at 290° C. Once the vacuum has been relieved with nitrogen, the polycarbonate is discharged from the tank and pelletised. The relative solution viscosity of the isolated polycarbonate is 1.291 (dichloromethane, 25° C., 5 g/l), the content of branching agent of the formula (6) is 85 ppm.

Example 10

5130 g (22.5 mol) of bisphenol A, 5104 g (23.85 mol) of diphenyl carbonate and 12.98 ml of a 1% aqueous solution of BEMP=2-tert.-butylimino-2-diethylamino-1, 3-dimethylperhydro-1,3-diaza-2-phosphorine ($2 \cdot 10^{-3}$ mol.%) are weighed out into a 25 l stirred vessel. The vessel is inertised with nitrogen and the raw materials are heated to 200° C. in 15 minutes. The stirrer is turned on at a melt temperature of 100° C. and a vacuum of 300 mbar applied. The temperature is maintained at 200° C. for one hour and the liberated phenol distilled off via a column. The temperature is raised to 250° C. within a further hour and the vacuum reduced to 100 mbar and then to 5 mbar in 30 minutes at 250° C. Once the temperature of the melt has been raised to 290° C., the vacuum is relieved with nitrogen and the formed oligomer discharged from the tank and pelletised. At this point in time, it has a relative solution viscosity of 1.149 (dichloromethane, 25° C., 5 g/l). This oligocarbonate is polycondensed in a ZSK 32 twin screw coextruder (100 rpm; 300° C.; 0.8 mbar; 2.0 kg/l). The relative solution viscosity of the polycarbonate isolated in this manner is 1.282 (dichloromethane, 25° C., 5 g/l), the content of branching agent of the formula (6) is 25 ppm.

We claim:

1. Transesterification process for the production of solvent-free polycarbonate starting from diphenols, carbonic acid diaryl esters and optionally branching agents and/or monophenols together with catalysts at temperatures of between 80° C. and 400° C. and pressures of 1000 mbar to 0.01 mbar, characterized in that phosphazenes catalysts of the formula (1)

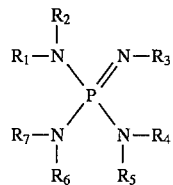

(1)

in which $R_1$, $R_2$, $R_3$, $R_4$, $R_5$, $R_6$, $R_7$=H, alkyl, alkenyl, cycloalkyl, aryl or cycloalkenyl and the residues $R_1$, $R_2$, $R_3$, $R_4$, $R_5$, $R_6$, $R_7$ are identical or different, or of the formula (2)

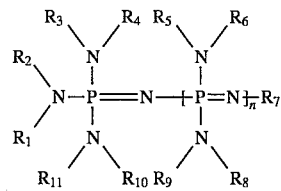

(2)

in which $R_1$ to $R_{11}$=H, alkyl, alkenyl, cycloalkyl, aryl or cycloalkenyl, n=1 to 10 and the residues $R_1$ to $R_1$ are identical or different, or of the formula (3)

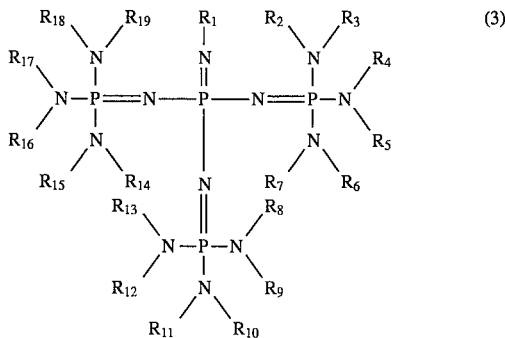

(3)

in which $R_1$ to $R_{19}$=H, alkyl, alkenyl, cycloalkyl, aryl or cycloalkenyl, are used as catalysts in quantities of $10^{-2}$ to $10^{-8}$ mol relative to 1 mol of diphenol.

2. The process of claim 1, wherein the catalyst is 2-tert-butylimino-2-diethylamino-1,3-dimethylperhydro-1,3-diaza-2-phosphorine.

3. The process of claim 1 wherein the catalyst is 1-tert-octyl-4,4,4-tris-(dimethylamino)-2,2-bis [tris (dimethylamino)-phosphorus-anylidene-amino]-2$\lambda^5$, 4$\lambda^5$-catenadi-(phosphazene).

4. The process of claim 1, wherein the catalyst is tert-octyliminotris-(dimethylamino)-phosphorane.

5. Process for the production of aromatic polycarbonate according to claim 1, characterised in that the content of the branching structure of the formula (4)

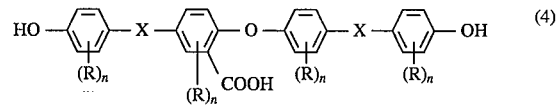

(4)

with

X=$C_1$-$C_5$ alkylidene or cycloalkylidene, S or a single bond and

R=$CH_3$, Cl or Br and n=zero, 1 or 2, in the polycarbonate does not exceed a value of 300 ppm after total saponification and HPLC determination.

6. Process for the production of aromatic polycarbonate according to claim 1, comprising two stages wherein the polycarbonate production in the first stage uses a catalysts according to claim 1 and wherein the polycarbonate production in the second stage is made with the addition of an alkali metal or alkaline-earth metal catalyst.

* * * * *